(12) United States Patent
Badding et al.

(10) Patent No.: US 11,695,118 B2
(45) Date of Patent: Jul. 4, 2023

(54) MODIFIED CATHODES FOR SOLID-STATE LITHIUM SULFUR BATTERIES AND METHODS OF MANUFACTURING THEREOF

(71) Applicants: Corning Incorporated, Corning, NY (US); Shanghai Institute of Ceramics Chinese Academy, Shanghai (CN)

(72) Inventors: Michael Edward Badding, Campbell, NY (US); Jun Jin, Shanghai (CN); Zhen Song, Painted Post, NY (US); Qing Wang, Shanghai (CN); Zhaoyin Wen, Shanghai (CN); Tongping Xiu, Shanghai (CN)

(73) Assignees: CORNING INCORPORATED, Corning, NY (US); Shanghai Institute of Ceramics Chinese Academy, Shanghai (CN)

( * ) Notice: Subject to any disclaimer, the term of this patent is extended or adjusted under 35 U.S.C. 154(b) by 131 days.

(21) Appl. No.: 16/877,293

(22) Filed: May 18, 2020

(65) Prior Publication Data
US 2020/0365897 A1    Nov. 19, 2020

(30) Foreign Application Priority Data
May 17, 2019   (CN) .................... 201910412097.X (51) Int. Cl.
*H01M 4/58*    (2010.01)
*H01M 4/66*    (2006.01)
*H01M 4/36*    (2006.01)
*H01M 10/0562*    (2010.01)
*H01M 10/0565*    (2010.01)
(Continued)

(52) U.S. Cl.
CPC ......... *H01M 4/5815* (2013.01); *H01M 4/131* (2013.01); *H01M 4/366* (2013.01); *H01M 4/663* (2013.01); *H01M 4/664* (2013.01); *H01M 10/052* (2013.01); *H01M 10/0562* (2013.01); *H01M 10/0565* (2013.01)

(58) Field of Classification Search
CPC ...... H01M 4/38; H01M 4/5815; H01M 4/366; H01M 10/0562; H01M 10/0565
See application file for complete search history.

(56) References Cited

U.S. PATENT DOCUMENTS

2009/0286163 A1    11/2009   Shin et al.
2015/0194701 A1    7/2015    Kim et al.
(Continued)

FOREIGN PATENT DOCUMENTS

WO    2015030407 A1    3/2015

OTHER PUBLICATIONS

Eftekhari et al; "Cathode Materials for Lithium-Sulfur Batteries: a Practical Perspective"; J. Mater. Chem. A, 2017, 5, 17734-17776.
(Continued)

*Primary Examiner* — Stephan J Essex (57) ABSTRACT

A lithium-sulfur battery includes: a substrate; a composite cathode disposed on the substrate; a solid-state electrolyte disposed on the composite cathode; and a lithium anode disposed on the solid-state electrolyte, such that the composite cathode comprises: active elemental sulfur, conductive carbon, sulfide electrolyte, and ionic liquid.

19 Claims, 5 Drawing Sheets

(51) Int. Cl.
H01M 10/052 (2010.01)
H01M 4/131 (2010.01)

(56) References Cited

U.S. PATENT DOCUMENTS

2015/0349307 A1* 12/2015 Dadheech ........... H01M 4/0409
427/446
2019/0088994 A1* 3/2019 Makino .................... H01B 1/10
2020/0058940 A1* 2/2020 Kim .................. H01M 10/0568

OTHER PUBLICATIONS

Fang et al; "More Reliable Lithium-Sulfur Batteries: Status, Solutions and Prospects", Adv. Mater., 2017, 29, 1606823.
Ito et al; "A Synthesis of Crystalline Li7P3S11 Solid Electrolyte From 1,2-Dimethoxyethane Solvent"; J. Power Sources, 2014, 271, 342-345.
Kim et al; "Hybrid Solid Electrolyte With the Combination of Li7La3Zr2O12 Ceramic and Ionic Liquid for High Voltage Pseudo-Solid-State Li-Ion BATTERIES" , J. Mater. Chem. A, 2016, 4, 17025-17032.
Liu et al; "Toothpaste-Like Electrode: a Novel Approach to Optimize the Interface for Solid-State Sodium-Ion Batteries With Ultralong Cycle Life"; ACS Appl. Mater. Interfaces, 2016, 8, 32631-32636.
Lu et al; "Highly Stable Garnet Solid Electrolyte Bases Li—S Battery With Modified Anodic and Cathodic Interfaces"; Energy Storage Materials, 2018, 15, 282-290.
Nagao et al; "Sulfur-Carbon Composite Electrode for All-Solid-State Li/S Battery With Li2S—P2S5 Solid Electrolyte"; Electrochim. Acta, 2011, 56, 6055-6059.
Ogoke et al; "Effective Stategies for Stabilizing Sulfur for Advanced Lithium-Sulfur Batteries"; J. Mater. Chem. A, 2017, 5, 448-469.
Oh et al; "Excellent Compatibility of Solvate Ionic Liquids With Sulfide Solid Electrolytes: Toward Favorable Ionic Contacts in Bulk-Type All-Solid-State Lithium-Ion Batteries"; Adv. Energy Mater., 2015, 5, 1500865.
Park et al; "Design Strategies, Practical Considerations, and New Solution Processes of Sulfide Solid Electrolytes for All-Solid-State Batteries"; Adv. Energy Mater., 2018, 8, 1800035.
Tachez et la; "Ionic Conductivity of and Phase Transition in Lithium Thiophosphate Li3PS4"; Solid State Ionics, 14, 1984, 181-185.
Xu et al; "All-Solid-State Lithium-Sulfur Batteries Based on a Newly Designed Li7P2.9Mn0.1S10.7I0.3 Superionic Conductor"; J. Mater. Chem. A, 2017, 5, 6310-6317.
Xu et al; "Construction of All-Solid-State Batteries Based on a Sulfur-Graphene Composite and Li9.54Si1.74P1.44S11.7Cl0.3 Solid Electrolyte"; Chem. Eur. J. 2017, 23, pp. 13950-13956.
Yao et al; "High-Performance All-Solid-State Lithium-Sulfur Batteries Enabled by Amorphous Sulfur-Coated Reduced Graphene Oxide Cathodes"; Adv. Energy Mater., 2017, 7, 1602923.

* cited by examiner

MODIFIED CATHODES FOR SOLID-STATE LITHIUM SULFUR BATTERIES AND METHODS OF MANUFACTURING THEREOF

This application claims the benefit of priority under 35 U.S.C. § 119 of Chinese Patent Application Serial No. 201910412097.X, filed on May 17, 2019, the content of which is relied upon and incorporated herein by reference in its entirety.

BACKGROUND

1. Field

This disclosure relates to cathodes for solid-state lithium sulfur (Li—S) batteries and methods of manufacturing thereof.

2. Technical Background

Lithium-sulfur (Li—S) batteries are promising candidates for replacing conventional lithium-ion batteries since they are high energy, low cost, and industrially scalable. For example, Li—S cell chemistries have a high energy density (e.g., 2600 W·h·kg$^{-1}$) and theoretical specific capacity (e.g., 1675 mA·h·g$^{-1}$), and a natural abundance of the environmentally friendly sulfur element.

Despite great promise, successful implementation of conventional Li—S batteries based on organic liquid electrolytes are hindered by short cycling life, caused mainly by the shuttling of highly soluble polysulfides in liquid electrolyte and lithium dendrites growth. In other words, the solubility of long-chain polysulfides produced during battery discharging in conventional organic electrolytes results in their migration from the cathode to the lithium (Li) anode, which induces unwanted side reactions, a lowered Coulombic efficiency, and a continuous loss of the active cathode material. Another challenge is the electronically and ionically insulating nature of elemental sulfur (when used as a component of the active material in the cathode), which requires a large fraction of conducting additives in the cathode, thereby significantly reducing practical capacity (e.g., energy density) and applicability.

The present application discloses improved cathodes and methods of formation thereof for solid-state lithium sulfur (Li—S) battery applications.

SUMMARY

In some embodiments, a lithium-sulfur battery, comprises: a substrate; a composite cathode disposed on the substrate; a solid-state electrolyte disposed on the composite cathode; and a lithium anode disposed on the solid-state electrolyte, wherein the composite cathode comprises: active elemental sulfur, conductive carbon, sulfide electrolyte, and ionic liquid.

In one aspect, which is combinable with any of the other aspects or embodiments, the battery further comprises: a coating layer disposed on the composite cathode; wherein the coating layer comprises a N—C—Co composite.

In one aspect, which is combinable with any of the other aspects or embodiments, the coating layer further comprises: polyethylene oxide and at least one of LiTFSI, LiTf, and LiBETI.

In one aspect, which is combinable with any of the other aspects or embodiments, the solid-state electrolyte comprises at least one of: $Li_{6.4}La_3Zr_{1.4}Ta_{0.6}O_{12}$ (LLZTO), $Li_{10}GeP_2S_{12}$, $Li_{1.5}Al_{0.5}Ge_{1.5}(PO_4)_3$, $Li_{1.4}Al_{0.4}Ti_{1.6}(PO_4)_3$, $Li_{0.55}La_{0.35}TiO_3$, interpenetrating polymer networks of poly (ethyl acrylate) (ipn-PEA) electrolyte, three-dimensional ceramic/polymer networks, in-situ plasticized polymers, composite polymers with well-aligned ceramic nanowires, PEO-based solid-state polymers, flexible polymers, polymeric ionic liquids, in-situ formed $Li_3PS_4$, or combinations thereof.

In one aspect, which is combinable with any of the other aspects or embodiments, the sulfide electrolyte comprises at least one of: $Li_{10}GeP_2S_{12}$, $\beta\text{-}Li_3PS_4$, $Li_{9.6}P_3S_{12}$, $Li_3PS_4$, and $Li_7P_3S_{11}$.

In one aspect, which is combinable with any of the other aspects or embodiments, the sulfide electrolyte comprises a $x(Li_2S)\text{-}y(P_2S_5)$ electrolyte material, where x and y are greater than one.

In one aspect, which is combinable with any of the other aspects or embodiments, the conductive carbon comprises: nanoparticles, nanowires, nanofibers, nanorods, nanotubes, nanospheres, graphene, carbon black, or combinations thereof.

In one aspect, which is combinable with any of the other aspects or embodiments, the ionic liquid comprises at least one of: PY14FSI, PY14TFSI, P13TFSI, P14TFSI, PYR13TFSI, PP14TFSI, or combinations thereof.

In one aspect, which is combinable with any of the other aspects or embodiments, a slurry of the composite cathode has a viscosity of at least 3000 cP.

In one aspect, which is combinable with any of the other aspects or embodiments, a battery as disclosed herein is configured to exhibit at least one of: an impedance below 130 Ω·cm$^2$; a reversible capacity of at least 1.6 mAh/cm$^2$; a battery cycling time of at least 250 hours; or a discharge capacity above at least 2 mAh in a first 10 cycles.

In some embodiments, a lithium-sulfur battery, comprises: a composite cathode disposed on a substrate; wherein the composite cathode comprises: active elemental sulfur, conductive carbon, sulfide electrolyte, and ionic liquid.

In one aspect, which is combinable with any of the other aspects or embodiments, the sulfide electrolyte comprises at least one of: $Li_{10}GeP_2S_{12}$, $\beta\text{-}Li_3PS_4$, $Li_{9.6}P_3S_{12}$, $Li_3PS_4$, and $Li_7P_3S_{11}$.

In one aspect, which is combinable with any of the other aspects or embodiments, the sulfide electrolyte comprises a $x(Li_2S)\text{-}y(P_2S_5)$ electrolyte material, where x and y are greater than one.

In one aspect, which is combinable with any of the other aspects or embodiments, the conductive carbon comprises: nanoparticles, nanowires, nanofibers, nanorods, nanotubes, nanospheres, graphene, carbon black, or combinations thereof.

In one aspect, which is combinable with any of the other aspects or embodiments, the ionic liquid comprises at least one of: PY14FSI, PY14TFSI, P13TFSI, P14TFSI, PYR13TFSI, PP14TFSI, or combinations thereof.

In one aspect, which is combinable with any of the other aspects or embodiments, a slurry of the composite cathode has a viscosity of at least 3000 cP.

In one aspect, which is combinable with any of the other aspects or embodiments, a battery as disclosed herein is configured to exhibit at least one of: an impedance below 130 Ω·cm$^2$; a reversible capacity of at least 1.6 mAh/cm$^2$; a battery cycling time of at least 250 hours; or a discharge capacity above at least 2 mAh in a first 10 cycles.

In some embodiments, a method of forming a composite cathode for a lithium-sulfur battery, comprises: synthesizing a sulfide electrolyte powder from $Li_2S$ and $P_2S_5$; preparing an active elemental sulfur/conductive carbon powder comprising carbon black and at least one carbon nanostructure; forming a mixture of the sulfide electrolyte powder and the active elemental sulfur/conductive carbon powder; and adding an ionic liquid to the mixture to form a composite cathode slurry having a viscosity of greater than 3000 cP.

In one aspect, which is combinable with any of the other aspects or embodiments, a weight ratio of the sulfide electrolyte powder to the active elemental sulfur/conductive carbon powder in the mixture is in a range of 5:2 to 5:5.

In one aspect, which is combinable with any of the other aspects or embodiments, the method further comprises: a second conductive carbon.

In one aspect, which is combinable with any of the other aspects or embodiments, a weight ratio of the ionic liquid to a total weight of the sulfide electrolyte powder, the active elemental sulfur/conductive carbon powder, and the second conductive carbon is in a range of 2:1 to 4:1.

BRIEF DESCRIPTION OF THE DRAWINGS

The disclosure will become more fully understood from the following detailed description, taken in conjunction with the accompanying figures, in which.

DETAILED DESCRIPTION

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments. It should be understood that the present application is not limited to the details or methodology set forth in the description or illustrated in the figures. It should also be understood that the terminology is for the purpose of description only and should not be regarded as limiting.

Additionally, any examples set forth in this specification are illustrative, but not limiting, and merely set forth some of the many possible embodiments of the claimed invention. Other suitable modifications and adaptations of the variety of conditions and parameters normally encountered in the field, and which would be apparent to those skilled in the art, are within the spirit and scope of the disclosure.

Aimed at solving the problems of conventional organic liquid electrolyte-based Li—S batteries, one approach uses solid state electrolytes (e.g., oxide ceramic electrolytes or sulfide glass-ceramic electrolytes). However, one problem of such cell configurations is the large impedance caused by the solid-solid contact among particles in electrodes and between electrodes and solid electrolytes. Addition of liquid electrolyte into the cathode creates severe polysulfide shuttling issues, since polysulfides dissolve in liquid electrolyte. Thus, this approach is impractical.

An alternative approach involves blending sulfide electrode materials (e.g., $Li_2S$—$P_2S_5$ and derivatives) into the sulfur cathode of solid-state Li—S batteries by ball-milling together with conductive carbon to impart the cathode with high ionic conductivity and improved (though still high) impedance. However, this too, proves impractical, as very high external pressure must be applied to the cell to ensure close contact of all solid particles during cell cycling.

The present disclosure relates to solid-state Li—S batteries comprising a universal cathode having small internal impedance and which is formed without high external pressures or liquid electrolyte addition. In particular, the present disclosure describes a toothpaste-like composite cathode enabled by ionic liquid and without lithium salt. Stated generally, the composite cathode comprises sulfide electrolyte particles, conductive carbon particles and elemental sulfur particles mixed together, with a subsequent addition of ionic liquid to decrease the contact impedance among all solid particles. The composite cathode may be soft, easy-to-handle, and can adhere (or be coated) onto solid electrolyte pellets. The paste form of the composite cathode has sufficient viscosity to form an intimate contact with both the solid electrolyte and an aluminum foil current collector to provide low interfacial resistance.

Figure 1:
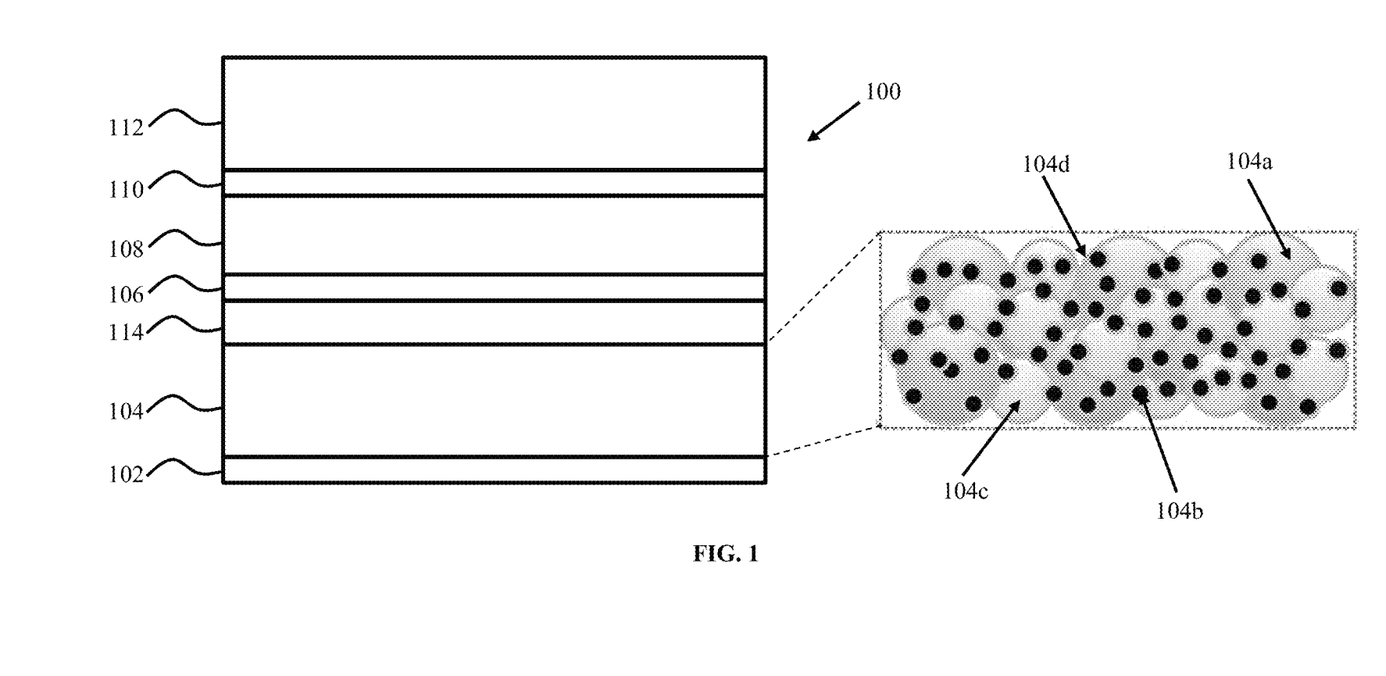
FIG. 1 illustrates a structure of a solid-state lithium sulfur (Li—S) battery and composite cathode thereof (enlarged), according to some embodiments.

FIG. 1 illustrates a structure of a solid-state lithium sulfur (Li—S) battery and composite cathode thereof (enlarged), according to some embodiments. It will be understood by those of skill in the art that the processes described herein can be applied to other configurations of solid-state lithium sulfur (Li—S) battery structures.

In some embodiments, battery 100 may include a substrate 102 (e.g., a current collector), a sulfur electrode (e.g., cathode) 104 disposed on the substrate, an optional coating layer 114 disposed on the cathode, an optional first interlayer 106 disposed on the coating layer, a solid-state electrolyte 108 disposed on the first interlayer, an optional second interlayer 110 disposed on the electrolyte, and a lithium electrode (e.g., anode) 112 disposed on the second interlayer. These can be disposed horizontally in relation to each other or vertically.

In some examples, the substrate 102 may a current collector including at least one of three-dimensional nickel (Ni) foam, carbon fiber, foils (e.g., aluminum, stainless steel, copper, platinum, nickel, etc.), or a combination thereof.

In some examples, the interlayer 106 and 110 may be independently chosen from at least one of carbon-based interlayers (e.g., interlinked freestanding, micro/mesopore containing, functionalized, biomass derived), polymer-based interlayers (e.g., PEO, polypyrrole (PPY), polyvinylidene fluoride, etc.), metal-based (e.g., Ni foam, etc.), or a combination thereof. In some examples, at least one of interlayers 106 or 110 are $PEO_{18}LiTFSI$-10% $SiO_{2-10}$% IL. In other words, the interlayer contains polyethylene oxide (PEO), bis(trifluoromethane) sulfonimide lithium salt (LiN $(CF_3SO_2)_2$, or LiTFSI), $SiO_2$ nanoparticles and ionic liquid (IL). Addition of $SiO_2$ and IL in the interlayer reduces the crystallinity of PEO and increases ionic conductivity.

In some examples, solid-state electrolyte 108 may be used to address common safety concerns such as leakage, poor chemical stability, and flammability often seen in Li—S batteries employing liquid electrolytes. Moreover, solid-state electrolytes can also suppress polysulfide shuttling from the cathode to the anode, thereby leading to improved cathode utilization and a high discharge capacity and energy density. In some examples, the solid-state electrolyte may include at least one of $Li_{6.4}La_3Zr_{1.4}Ta_{0.6}O_{12}$ (LLZTO), $Li_{10}GeP_2S_{12}$, $Li_{1.5}Al_{0.5}Ge_{1.5}(PO_4)_3$, $Li_{1.4}Al_{0.4}Ti_{1.6}(PO_4)_3$, $Li_{0.55}La_{0.35}TiO_3$, interpenetrating polymer networks of poly (ethyl acrylate) (ipn-PEA) electrolyte, three-dimensional ceramic/polymer networks, in-situ plasticized polymers, composite polymers with well-aligned ceramic nanowires, PEO-based solid-state polymers, flexible polymers, polymeric ionic liquids, in-situ formed $Li_3PS_4$, or combinations thereof.

In some examples, the anode 112 may comprise lithium (Li) metal. In some examples, the battery may include at least one anode protector such as electrolyte additives (e.g., $LiNO_3$, lanthanum nitrate, copper acetate, $P_2S_5$, etc.), artificial interfacial layers (e.g., $Li_3N$, $(CH_3)_3SiCl$, $Al_2O_3$, LiAl, etc.), composite metallics (e.g., $Li_7B_6$, Li-rGO (reduced graphene oxide), layered Li-rGO, etc.), or combinations thereof. In some examples, a thin layer of metal (e.g., Au) may be ion-sputter coated to form a contact interface between the anode 112 and first interlayer 106 or between the anode and solid-state electrolyte 108. In some examples, a thin layer of silver (Ag) paste may be brushed to a surface of the solid-state electrolyte 108 to form a close contact between the anode 112 and solid-state electrolyte 108.

In some examples, the coating layer 114 may comprise at least one of carbon polysulfides (CS), polyethylene oxides (PEO), polyaniline (PANI), polypyrrole (PPY), poly(3,4-ethylenedioxythiophene) (PEDOT), polystyrenesulfonic acid (PSS), polyacrylonitrile (PAN), polyacrylic acid (PAA), polyallylamine hydrochloride (PAH), poly(vinylidene fluoride-co-hexafluoropropylene) (P(VdF-co-HFP)), poly(methylmethacrylate) (PMMA), polyvinylidene fluoride (PVDF), poly(diallyldimethyl ammonium) bis(trifluoromethanesulfonyl)imide (TFSI) (PDDATFSI), or combinations thereof, and at least one lithium salt (e.g., bis(trifluoromethane) sulfonimide lithium salt $(LiN(CF_3SO_2)_2)$(LiTFSI), lithium perchlorate, lithium bis(oxalato) borate (LiBOB), lithium bis(fluorosulfonyl)imide (LiFSI), lithium trifluoromethanesulfonate ($LiCF_3SO_3$) (LiTf), lithium bis(trifluoromethanesulfonimide) ($Li(C_2F_5SO_2)_2N$) (LiBETI), or combinations thereof).

In some examples, the coating layer may additionally comprise at least one of, or at least two of, or at least three of nitrogen, carbon, cobalt, titanium, tantalum, and tungsten. In some examples, the coating layer comprises a N—C—Co composite having at least one dimension in a range of 1 nm to 100 nm, or 5 nm to 50 nm, or 10 nm to 50 nm, or 10 nm to 25 nm, any value or range disclosed therein. In some examples, the coating layer comprises a N—C—Co composite having a calculated Brunauer-Emmett-Teller (BET) surface area in a range of 50 $m^2/g$ to 500 $m^2/g$, or 100 $m^2/g$ to 400 $m^2/g$, or 50 $m^2/g$ to 250 $m^2/g$, or 100 $m^2/g$ to 300 $m^2/g$, or 300 $m^2/g$ to 500 $m^2/g$, or 50 $m^2/g$ to 200 $m^2/g$, or any value or range disclosed therein.

In some examples, the coating layer comprises polyethylene oxide. In some examples, the coating layer comprises polyethylene oxide and at least one of LiTFSI, LiTf, and LiBETI. In some examples, the coating layer comprises polyethylene oxide, at least one of LiTFSI, LiTf, and LiBETI, and all three of nitrogen, carbon, and cobalt (e.g., N—C—Co composite). Because of the pores and pathways within the interior of the cathode, a portion of the coating layer slurry is able to penetrate therein through its porous structure after it has been coated onto the surface of the cathode. This surface coating and internal penetration improves interfacial compatibility and enhances ionic conductivity of the resultant sulfur electrode. In some examples, the cathode 104 and coating layer 114 have a combined thickness of less than 200 μm, or less than 180 μm, or less than 160 μm, or less than 140 μm, or less than 120 μm, or less than 100 μm, or any value or range disclosed therein.

Description of the sulfur cathode 104 and methods of formation are described in the Examples below.

FIG. 1 illustrates a structure of a composite cathode (enlarged), according to some embodiments, which includes active elemental sulfur 104a, conductive carbon 104b, sulfide electrolyte 104c, and ionic liquid 104d (e.g., PY14FSI, PY14TFSI, P13TFSI, P14TFSI, PYR13TFSI, PP14TFSI, or combinations thereof). Without ionic liquid, particles of the active elemental sulfur 104a, conductive carbon 104b, and sulfide electrolyte 104c exhibit a solid-solid contact, thereby resulting in a large internal impedance. When ionic liquid 104d is added into the composite cathode, enhanced superior contact between the active elemental sulfur 104a, conductive carbon 104b, and sulfide electrolyte 104c is formed inside the cathode.

EXAMPLES

Example 1—Preparation of Composite Cathode $Li_7P_3S_{11}$ Sulfide Electrolyte Preparation Due to the sensitivity of sulfide electrolyte to moisture, all preparation processes are performed in an argon (Ar)-filled glovebox. $Li_7P_3S_{11}$ powder is synthesized from $Li_2S$ (Alfa Aesar, 99.9%) and $P_2S_5$ (Sigma-Aldrich, 99%) in acetonitrile (Selectilyte BASF, battery grade). Both $Li_2S$ and $P_2S_5$ are dissolved in acetonitrile (ACN) solvent with a molar ratio of 7:3 and then stirred for 24 hours at 70° C. The weight ratio of solvent ACN to total mass of $Li_2S$ and $P_2S_5$ is in a range of about 20-40:1. Thereafter, the obtained greenish solution containing white precipitate was evaporated in vacuum at 50° C. to avoid liquid boiling. Subsequently, the precursor powder was further heated under vacuum at 80° C. for 6 hours to remove residual solvent. After drying, the powder is heated at 225° C. in an Ar atmosphere to crystallize into a $Li_7P_3S_{11}$ phase. The final $Li_7P_3S_{11}$ powder is hereinafter referred to as "LPS225."

In some examples, the sulfide electrolyte may comprise at least one of $Li_{10}GeP_2S_{12}$, $β-Li_3PS_4$, $Li_{9.6}P_3S_{12}$, $Li_3PS_4$, and $Li_7P_3S_{11}$. In some examples, the sulfide electrolyte may comprise a $x(Li_2S)$-$y(P_2S_5)$ electrolyte material, where x and y are greater than one.

Active Elemental Sulfur/Conductive Carbon Powder Preparation

Active material sulfur powder (65 wt. % sulfur powder) and conductive carbon (30 wt. % Ketjen black (KB) carbon powder and 5 wt. % carbon nanotubes (CNT molecular weight: 2040)) are mixed thoroughly by ball-mill grounding for 12 hours. The dried and sieved composite is then sealed in a crucible and heated at 155° C. for 12 hours under vacuum. The final active elemental sulfur/conductive carbon powder is hereinafter referred to as "S/C composite."

Toothpaste-Like Composite Cathode Preparation

LPS225 and S/C composite are positioned in an agate mortar at a weight ratio of LPS225:S/C composite in a range of 5:2 to 5:5. Highly conductive carbon black (e.g., Super P) is then added into the mixture to enhance electronic conductivity, keeping the weight ratio of S/C composite to Super P in a range of about 2-4:1. Ionic liquid (IL) (e.g., PY14FSI, PY14TFSI, P13TFSI, P14TFSI, PYR13TFSI, PP14TFSI, or combinations thereof) is added to the thoroughly ground mixture of LPS225, S/C composite, and Super P. The weight ratio of IL to the total mass of LPS225, S/C composite, and Super P is about 2-4:1. After continuous grinding for 30 min, a toothpaste-like composite cathode paste (i.e., slurry) is obtained having a viscosity of greater than 3000 cP.

Example 2—Preparation of Solid-State Electrolyte

Cubic phase $Li_{6.4}La_3Zr_{1.4}Ta_{0.6}O_{12}$(LLZTO) is synthesized from starting powders of $LiOH.H_2O$ (AR), $La_2O_3$ (99.99%), $ZrO_2$ (AR), and $Ta_2O_5$ (99.99%) with a stoichiometric ratio. About 2 wt. % excess of $LiOH.H_2O$ is added to compensate for lithium loss during the sintering process. Traces of moisture and adsorbed $CO_2$ is removed from $La_2O_3$ by heating at 900° C. for about 12 hours. Raw materials are mixed via a wet grinding process in which yttrium-stabilized zirconium oxide (YSZ) balls and isopropanol (IPA) are used as the milling media. The mixture is then dried and calcined at 950° C. for 6 hours in an alumina crucible, followed by a second mixing step, and calcined at 950° C. for 6 hours again to obtain pure cubic garnet phase powder. These powders are pressed into green pellets with diameters (D) of about 16 mm, and sintered at 1250° C. for 10 hours, and were covered with a LLZTO powder with 10 wt. % Li excess in platinum crucibles. Well-sintered pellets are polished to a thickness of about 0.8 mm.

A thin layer of gold (Au) may be ion-sputter coated on one side of the LLZTO ceramic electrolyte for 10 min. This Au layer may improve wetting properties of a lithium anode on the electrolyte. The sample is then transferred into an Ar-filled glove box. A portion of Li foil is melted by heating to at least 250° C. (e.g., 300° C.). The melted lithium is then cast on a surface of the LLZTO pellet comprising the ion-sputter coated Au layer to form a superior contact between lithium anode and Au-modified LLZTO ceramic electrolyte pellet.

Example 3—Preparation of Interlayer

PEO powder and lithium salt (as disclosed herein) were dissolved into acetonitrile with the molar ratio of $EO/Li^+$ at about (6-20):1. 10-20% ionic liquid (as in Example 1) with 10 wt. % ceramic filler (e.g., $SiO_2$, $Al_2O_3$, CuO, etc.) is added to the PEO/Li salt acetonitrile solution, and fully mixed. The concentration of ceramic filler is in a range of 1 wt. % to 15 wt. %, determined as a function of silica particle size. The ceramic filler helps to reduce the PEO crystallinity and improve $Li^+$ conductivity. This slurry is cast into a polytetrafluoroethylene (PTFE) mold, followed by vacuum drying. The interlayer between the cathode and electrolyte reduces interfacial impedance. In order not to significantly reduce the mass energy density and bulk energy density of the solid-state battery, the interlayer thickness is as thin as possible. In some examples, the thickness of the interlayer may be in a range of 5 μm to 50 μm or in a range of 50 μm to 150 μm.

Example 4—Battery Assembly

Figure 9:
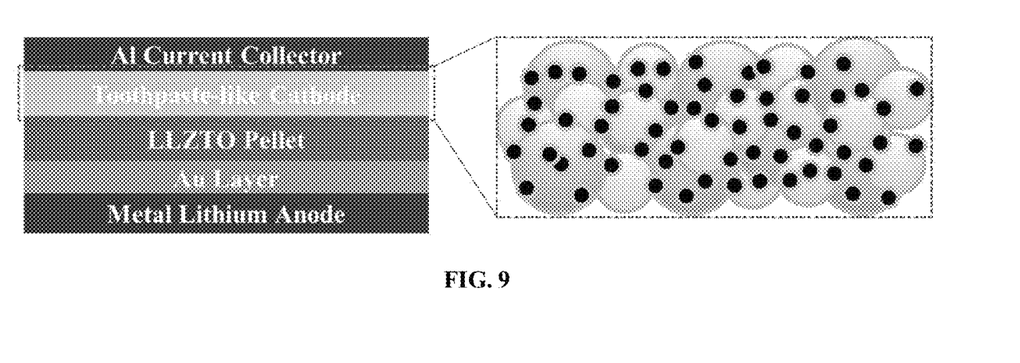
FIG. 9 illustrates a schematic diagram of a full battery based on a composite cathode and LLZTO pellet electrolyte, according to some embodiments.

Li—S batteries obtained by the processes described herein are composed of toothpaste-like composite cathode 104 coated with an optional coating layer 114, optional PEO-based interlayers 106 and 110, LLZTO ceramic solid-state electrolyte 108 and lithium metal anode 112. The solid-state lithium sulfur battery is assembled in an argon glove box. The composite cathode paste of Example 1 is coated onto a side of the LLZTO ceramic solid-state electrolyte opposite to the lithium metal anode, and then aluminum foil is attached onto the cathode as the current collector. Sulfur loading in the toothpaste-like composite cathode on the electrolyte surface is in a range of about 3 mg/cm² to 6 mg/cm². The final battery assembly is inserted into a coin cell (CR2032) with a piece of nickel foam. One structure of the lithium sulfur battery is shown in FIG. 1. Another structure of the lithium sulfur battery is shown in FIG. 9.

In some examples, the formed battery exhibits an impedance below 250 Ω·cm², or below 225 Ω·cm², or below 200 Ω·cm², or below 175 Ω·cm², or below 150 Ω·cm², or below 125 Ω·cm², or any value or range disclosed therein. In some examples, the formed battery exhibits a reversible capacity of at least 500 mA/hgs¹, or at least 600 mA/hgs¹, or at least 700 mA/hgs¹, or at least 800 mA/hgs¹, or at least 900 mA/hgs¹, or at least 1000 mA/hgs¹, or any value or range disclosed therein, at first cycle. In some examples, the formed battery exhibits a capacity retention of at least 40%, or at least 50%, or at least 60%, or at least 70%, or at least 80%, or at least 90%, or at least 95%, or at least 99%, or any value or range disclosed therein, after 50 cycles.

Example 5—Characterization Studies

The composite cathode used in characterization studies (described below) may be prepared by mixing 0.25 g of LPS225 ($Li_7P_3S_{11}$ sulfide electrolyte powder, see Example 1), 0.15 g of S/C composite powder (see Example 1), and 0.05 g of Super P conductive carbon powder, and then grinding thoroughly in an agate morta. One mL of N-butyl-N-methylpyrrolidinium bis (fluorosulfonyl)imide (PY14FSI) ionic liquid (IL) was added to the ground powder mixture. After continuous hand-grinding for 30 min, the composite cathode was obtained. Viscosity of the cathode is measured approximately 4180 cP. The composite cathode was then coated onto one side of a LLZTO pellet electrolyte (see Example 2), with the other side of the LLZTO pellet contacting closely with a metal lithium wafer through an Au sputtering layer (disposed therebetween) formed via a melting-alloying process. Results show that the sulfur loading in the composite cathode on the LLZTO pellet surface is about 4 mg/cm². The full battery was constructed in a coin cell CR2032 with a diameter of 20 mm and a height of 3.2 mm.

FIG. 9 illustrates a schematic diagram of a full battery based on the composite cathode and LLZTO pellet electrolyte. The LLZTO pellet may enhance the strength of the entire battery construction, as well as be a conductor of lithium ions. With the composite cathode linking the Al current collector and the LLZTO pellet, the full battery may function without external pressures.

Comparative Example 1

The battery is prepared as in Example 5, excluding the presence of ionic liquid (IL) during preparation of the composite cathode.

Characterization of Example 5 and Comparative Example 1

Morphology and Phase Analysis

SEM images are obtained by scanning electron microscope (Hitachi JSM 6700). Element mapping images are characterized by an energy dispersive spectrometer (EDS) affiliated with the HITACHI SEM.

Raman spectroscopy is conducted using a Thermo Scientific DXR in order to verify phosphorus-sulfide anion structures in tested samples.

Electrochemical Impedance Spectroscopy

Electrochemical impedance spectroscopy (EIS) is conducted with an Autolab electrochemical workstation (ECO CHEMIE B.V., Netherlands) with a Frequency Response Analyzer.

Electrochemical Performance

Charge and discharge curves for solid state lithium sulfur batteries are measured with LAND CT2001A battery test system (China) in a voltage range from 3V to 1.5V under a current density of 0.1 mA/cm$^2$ at 60° C.

Figure 2:
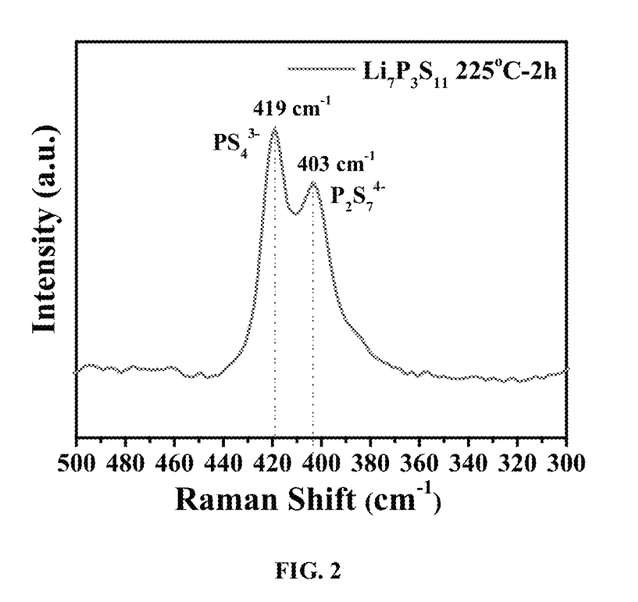
FIG. 2 illustrates Raman spectrum of $Li_7P_3S_{11}$ sulfide electrolyte after heat treatment, according to some embodiments.

Turning now to the figures, FIG. 2 illustrates Raman spectrum of Li$_7$P$_3$S$_{11}$ sulfide electrolyte (for Example 5) after heat treatment at 225° C. Two peaks are observed at 403 cm-1 and 419 cm$^{-1}$, which may correspond to the characteristic stretching of P$_2$S$_7^{4-}$ and PS$_4^{3-}$, respectively. The intensity ratio of the two peaks confirms that the LPS225 powder is, in fact, Li$_7$P$_3$S$_{11}$. Because no P$_2$S$_6^{4-}$ peak exists at 380 cm$^{-1}$ (characteristic of low-ionic conductive phase Li$_4$P$_2$S$_6$), it is concluded that the high-ionic conductive phase Li$_7$P$_3$S$_{11}$ is the main phase of the final sulfide electrolyte.

Figure 3:
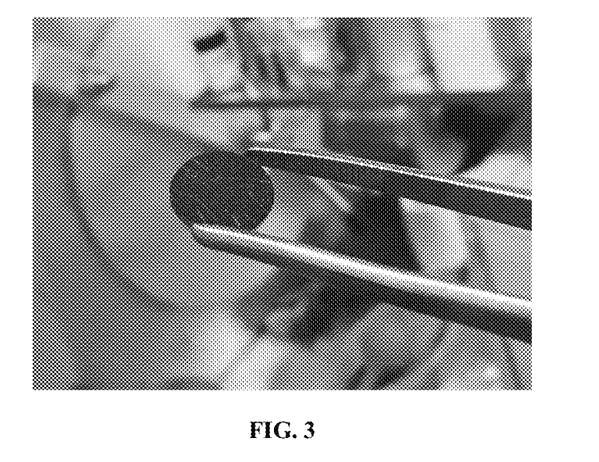
FIG. 3 illustrates a digital image of a composite cathode coated on a surface of oxide ceramic, according to some embodiments.
Figure 4:
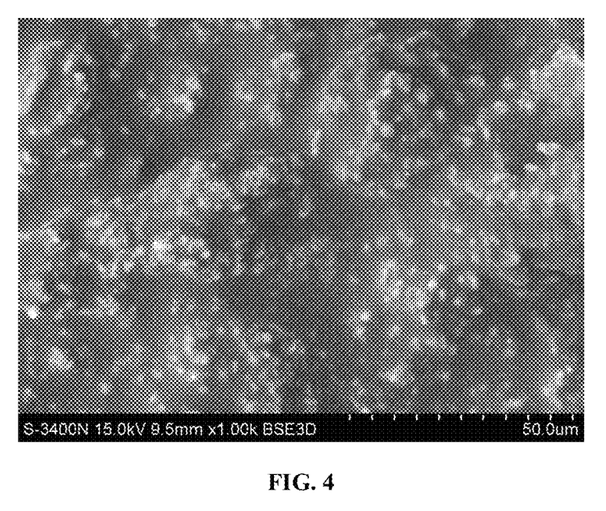
FIG. 4 illustrates a scanning electron microscope (SEM) image of a composite cathode, according to some embodiments.
Figure 5:
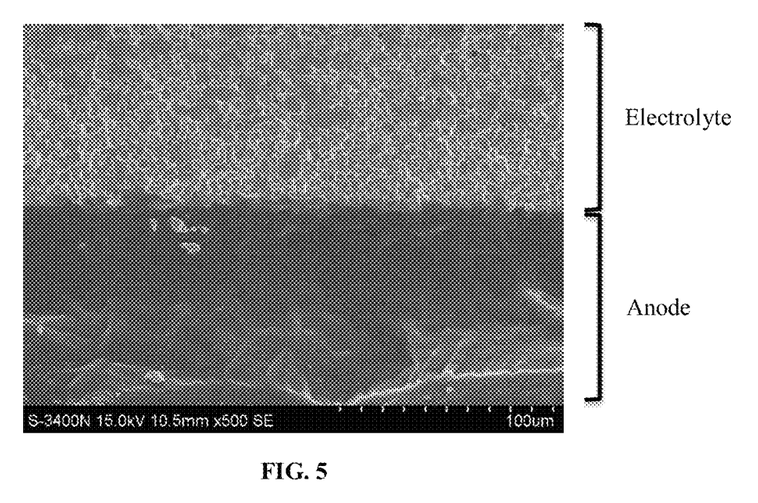
FIG. 5 illustrates an SEM image of a cross-section of a Li—Au/LLZTO interface, according to some embodiments.

FIG. 3 illustrates a digital image of a composite cathode coated on a surface of oxide ceramic LLZTO; good contact was formed between the composite cathode and the LLZTO pellet electrolyte of Example 5. For example, FIG. 4 illustrates a scanning electron microscope (SEM) image of the morphology of the composite cathode, from which it is concluded that all sulfide electrolyte powders (white particles) exhibit a close contact for Example 5. Further through the stack, FIG. 5 illustrates an SEM image of a cross-section of a Li—Au anode/LLZTO pellet electrolyte interface having superior contact between the anode and electrolyte for Example 5. Current density at the anode/electrolyte interface is a crucial factor in regulating the morphology of Li deposits. Moreover, lithium dendrites growth may be inhibited in cell systems when the local current density is reduced. With intimate contact between the lithium anode and LLZTO pellet, the full battery system can achieve desired electrochemical performance. Thus, as seen with FIGS. 4 and 5, for the full battery of Example 5, good contact is formed from the anode through the electrolyte and into the composite cathode, thereby enabling desired impedance, stability, and discharge capacity performance characteristics.

Figure 6:
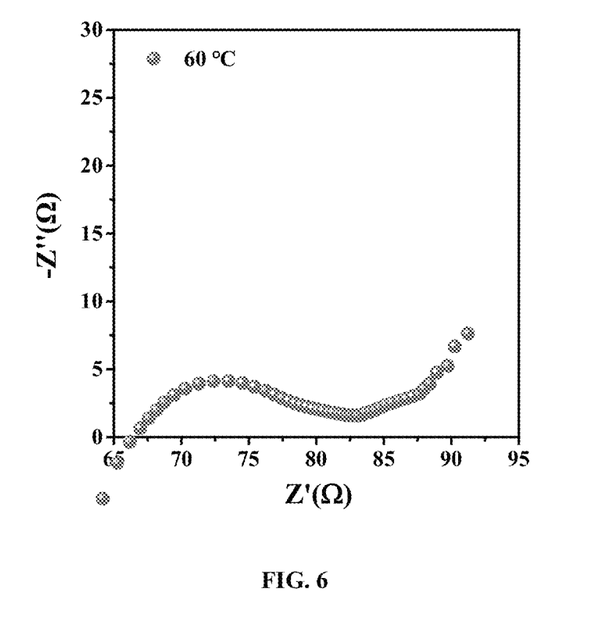
FIG. 6 illustrates an electrochemical impedance spectroscopy (EIS) spectrum of a full battery based on a composite cathode, according to some embodiments.
Figure 7:
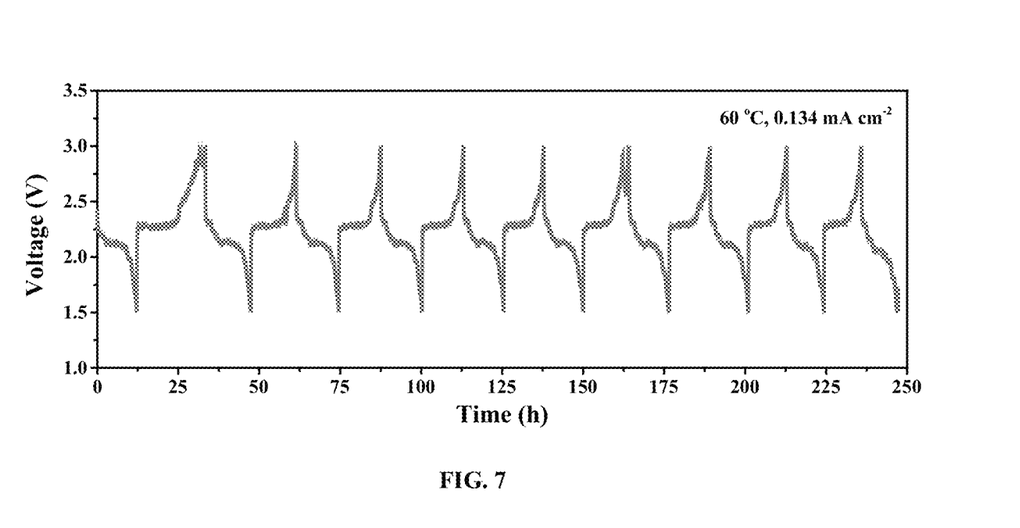
FIG. 7 illustrates a voltage-time curve of a full battery operating at 60° C. and with a current density of 0.134 mA/cm$^2$, according to some embodiments.
Figure 8:
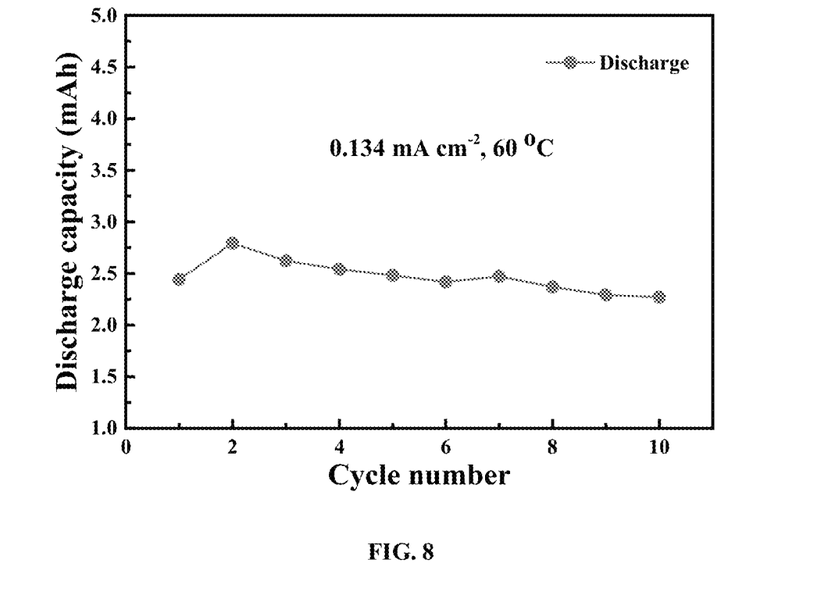
FIG. 8 illustrates cycling performance of a full battery operating at 60° C. and with a current density of 0.134 mA/cm$^2$, according to some embodiments.

FIG. 6 illustrates an electrochemical impedance spectroscopy (EIS) spectrum of a full battery based on a composite cathode at 60° C. As compared with Comparative Example 1 (i.e., no ionic liquid addition), which has an impedance too large for detection, the impedance of the full battery for Example 5 is less than 130 Ω·cm$^2$. FIGS. 7 and 8 show electrochemical performance of a full battery based on the composite cathode and LLZTO pellet of Example 5. In particular, FIG. 7 illustrates a voltage-time curve of the full battery operating at 60° C. while FIG. 8 illustrates cycling performance of the full battery operating at 60° C. With a current density of 0.134 mA/cm$^2$, the battery cycled stably for 250 hours (FIG. 7) and the discharge capacity was above 2 mAh in the first 10 cycles (FIG. 8). Discharge capacities above 2 mAh are relatively high as compared with conventional batteries. In contrast, Comparative Example 1 would not operate at higher temperature. Thus, because of its high impedance, Comparative Example 1 would not be operable even at 60° C. The capacity of 2 mAh is a high value compared with published literatures and disclosed patents.

Thus, as presented herein, this disclosure relates to solid-state lithium sulfur (Li—S) batteries, and more particularly, to composite sulfur cathodes (and their method of production) based on sulfide solid electrolytes. In other words, a composite sulfur cathode comprising: sulfide electrolyte as an ionic conductor, carbon additive as an electron conductor, elemental sulfur as an active material and ionic liquid is disclosed as a means for decreasing impedance inside the cathode.

Preparation of the composite cathode comprises at least two steps. In a first step, synthesis of a sulfide electrolyte via a liquid-phase method, in which acetonitrile (ACN) is used as the solvent and lithium sulfide (Li$_2$S) and phosphorus pentasulfide (P$_2$S$_5$) are adopted as raw materials. Sulfide electrolyte powder with high ionic conductivity may be obtained after heat treatment of the precursor powder after drying. In a second step, sulfide electrolyte powder, elemental sulfur powder, Super P carbon powder and ionic liquid are mixed by hand-grinding in an agate mortar. The obtained toothpaste-like composite cathode may be cast onto oxide ceramic electrolyte pellets, and the full battery with Al foil as the current collector and metal lithium as the anode electrode delivers reversible capacity larger than 1.6 mAh/cm$^2$ and has stable cycling performance.

Advantages include (1) a composite cathode that is lithium ion conductive and electronic conductive; (2) an ionic liquid (with no lithium salt) that decreases internal impedance of the cathode; (3) intimate contact of a toothpaste-like composite cathode with ceramic electrolytes that enables low interfacial resistance; (4) a battery assembly capable of working without external pressure; (5) no usage of liquid electrolyte, which avoids dissolution of polysulfides and mitigates polysulfide shuttling; and (6) usage of oxide electrolyte pellets as the separator of the battery, thereby avoiding lithium dendrite growth and polysulfide shuttling.

Therefore, the Li—S battery made from the cathode formed from the methods presented herein has a higher reversible capacity (e.g., greater than 1.6 mAh/cm$^2$), lower overall impedance, and more stable cycling performance, as compared with conventional Li—S batteries.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As utilized herein, "optional," "optionally," or the like are intended to mean that the subsequently described event or circumstance can or cannot occur, and that the description includes instances where the event or circumstance occurs and instances where it does not occur. The indefinite article "a" or "an" and its corresponding definite article "the" as used herein means at least one, or one or more, unless specified otherwise.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A lithium-sulfur battery, comprising:
   a substrate;
   a composite cathode disposed on the substrate;
   a coating layer disposed on the composite cathode, the coating layer further positioned within an interior of the composite cathode and penetrating a porous structure of the composite cathode, and the coating layer comprises a N—C—Co composite, polyethylene oxide, and at least one of LiTFSI, LiTf, or LiBETI;
   a solid-state electrolyte, the coating layer positioned between the composite cathode and the solid-state electrolyte; and
   a lithium anode disposed on the solid-state electrolyte,
   wherein the composite cathode comprises active elemental sulfur, conductive carbon, sulfide electrolyte, and ionic liquid.

2. The battery of claim 1, wherein the solid-state electrolyte comprises at least one of: $Li_{6.4}La_3Zr_{1.4}Ta_{0.6}O_{12}$ (LLZTO), $Li_{10}GeP_2S_{12}$, $Li_{1.5}Al_{0.5}Ge_{1.5}(PO_4)_3$, $Li_{1.4}Al_{0.4}Ti_{1.6}(PO_4)_3$, $Li_{0.55}La_{0.35}TiO_3$, interpenetrating polymer networks of poly(ethyl acrylate) (ipn-PEA) electrolyte, three-dimensional ceramic/polymer networks, in-situ plasticized polymers, composite polymers with well-aligned ceramic nanowires, PEO-based solid-state polymers, flexible polymers, polymeric ionic liquids, in-situ formed $Li_3PS_4$, or combinations thereof.

3. The battery of claim 1, wherein the sulfide electrolyte comprises at least one of: $Li_{10}GeP_2S_{12}$, $\beta$-$Li_3PS_4$, $Li_{9.6}P_3S_{12}$, $Li_3PS_4$, or $Li_7P_3S_{11}$.

4. The battery of claim 1, wherein the sulfide electrolyte comprises a $x(Li_2S)$-$y(P_2S_5)$ electrolyte material, where x and y are greater than one.

5. The battery of claim 1, wherein the conductive carbon comprises: nanoparticles, nanowires, nanofibers, nanorods, nanotubes, nanospheres, graphene, carbon black, or combinations thereof.

6. The battery of claim 1, wherein the ionic liquid comprises at least one of: PY14FSI, PY14TFSI, P13TFSI, P14TFSI, PYR13TFSI, PP14TFSI, or combinations thereof.

7. The battery of claim 1, wherein the composite cathode has a viscosity of at least 3000 cP.

8. The battery of claim 1, configured to exhibit at least one of:
   an impedance below 130 $\Omega \cdot cm^2$;
   a reversible capacity of at least 1.6 mAh/cm$^2$;
   a battery cycling time of at least 250 hours; or
   a discharge capacity above at least 2 mAh in a first 10 cycles.

9. A lithium-sulfur battery, comprising:
   a composite cathode disposed on a substrate; and
   a coating layer disposed on the composite cathode, the coating layer further positioned within an interior of the composite cathode and penetrating a porous structure of the composite cathode, and the coating layer comprises a N—C—Co composite, polyethylene oxide, and at least one of LiTFSI, LiTf, or LiBETI,
   wherein the composite cathode comprises: active elemental sulfur, conductive carbon, sulfide electrolyte, and ionic liquid.

10. The battery of claim 9, wherein the sulfide electrolyte comprises at least one of: $Li_{10}GeP_2S_{12}$, $\beta$-$Li_3PS_4$, $Li_{9.6}P_3S_{12}$, $Li_3PS_4$, or $Li_7P_3S_{11}$.

11. The battery of claim 9, wherein the sulfide electrolyte comprises a $x(Li_2S)$-$y(P_2S_5)$ electrolyte material, where x and y are greater than one.

12. The battery of claim 9, wherein the conductive carbon comprises: nanoparticles, nanowires, nanofibers, nanorods, nanotubes, nanospheres, graphene, carbon black, or combinations thereof.

13. The battery of claim 9, wherein the ionic liquid comprises at least one of: PY14FSI, PY14TFSI, P13TFSI, P14TFSI, PYR13TFSI, PP14TFSI, or combinations thereof.

14. The battery of claim 9, wherein the composite cathode has a viscosity of at least 3000 cP.

15. The battery of claim 9, configured to exhibit at least one of:
   an impedance below 130 $\Omega \cdot cm^2$;
   a reversible capacity of at least 1.6 mAh/cm$^2$;
   a battery cycling time of at least 250 hours; or
   a discharge capacity above at least 2 mAh in a first 10 cycles.

16. A method of forming a composite cathode for a lithium-sulfur battery, comprising:
   synthesizing a sulfide electrolyte powder from $Li_2S$ and $P_2S_5$;
   preparing an active elemental sulfur/conductive carbon powder comprising carbon black and at least one carbon nanostructure;
   forming a mixture of the sulfide electrolyte powder and the active elemental sulfur/conductive carbon powder;
   adding an ionic liquid to the mixture to form a composite cathode slurry having a viscosity of greater than 3000 cP; and
   disposing a coating layer on the composite cathode slurry, the coating layer penetrates a porous structure of the composite cathode slurry to be positioned within an interior of the composite cathode slurry, and the coating layer comprises a N—C—Co composite, polyethylene oxide, and at least one of LiTFSI, LiTf, or LiBETI.

17. The method of claim 16, wherein a weight ratio of the sulfide electrolyte powder to the active elemental sulfur/conductive carbon powder in the mixture is in a range of 5:2 to 5:5.

18. The method of claim 16, further comprising a second conductive carbon.

19. The method of claim 18, wherein a weight ratio of the ionic liquid to a total weight of the sulfide electrolyte powder, the active elemental sulfur/conductive carbon powder, and the second conductive carbon is in a range of 2:1 to 4:1.

* * * * *

UNITED STATES PATENT AND TRADEMARK OFFICE
CERTIFICATE OF CORRECTION

| | |
|---|---|
| PATENT NO. | : 11,695,118 B2 |
| APPLICATION NO. | : 16/877293 |
| DATED | : July 4, 2023 |
| INVENTOR(S) | : Michael Edward Badding et al. |

It is certified that error appears in the above-identified patent and that said Letters Patent is hereby corrected as shown below:

On the Title Page

On the page 2, in Column 1, under "Other Publications", Line 8, delete "BATTERIES" and insert -- Batteries --.

On the page 2, in Column 2, under "Other Publications", Line 7, delete "Stategies" and insert -- Strategies --.

Signed and Sealed this
Fifteenth Day of October, 2024

Katherine Kelly Vidal
*Director of the United States Patent and Trademark Office*